(12) United States Patent
Fishburn et al.

(10) Patent No.: US 7,256,230 B2
(45) Date of Patent: Aug. 14, 2007

(54) POLYCARBONATE RESIN COMPOSITIONS AND ARTICLES THEREFROM

(75) Inventors: James Ross Fishburn, Slingerlands, NY (US); Erwin Marie Alfred Gijzen, Poortvliet (NL); Johannes Martinus Dina Goossens, Bergen op Zoom (NL); Walter van der Heijden, Oosterhout (NL); Henricas Hubertus Maria van Hout, Halsteren (NL); Hendrik Verhoogt, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 578 days.

(21) Appl. No.: 10/755,953

(22) Filed: Jan. 13, 2004

(65) Prior Publication Data

US 2006/0128851 A1    Jun. 15, 2006

Related U.S. Application Data

(62) Division of application No. 10/064,868, filed on Aug. 26, 2002, now Pat. No. 6,716,902, which is a division of application No. 09/923,630, filed on Aug. 7, 2001, now Pat. No. 6,518,340.

(51) Int. Cl.
   *C08K 5/29* (2006.01)
(52) U.S. Cl. .................................................. 524/195
(58) Field of Classification Search ................ 524/195
   See application file for complete search history.

(56) References Cited

U.S. PATENT DOCUMENTS

| | | |
|---|---|---|
| 3,169,121 A | 2/1965 | Goldberg |
| 3,635,895 A | 1/1972 | Kramer |
| 3,845,007 A | 10/1974 | Nouvertne et al. |
| 3,876,580 A | 4/1975 | Nouvertne et al. |
| 3,933,734 A | 1/1976 | Mark et al. |
| 3,951,910 A | 4/1976 | Mark |
| 3,953,399 A | 4/1976 | Mark |
| 3,978,024 A | 8/1976 | Mark |
| 4,001,175 A | 1/1977 | Mark |
| 4,001,184 A | 1/1977 | Scott |
| 4,028,297 A | 6/1977 | Webb |
| 4,093,589 A | 6/1978 | Factor et al. |
| 4,101,246 A | 7/1978 | Erickson |
| 4,110,307 A | 8/1978 | Mark |
| 4,113,695 A | 9/1978 | Mark |
| 4,174,359 A | 11/1979 | Sivaramakrishnan et al. |
| 4,220,583 A | 9/1980 | Mark |
| 4,223,100 A | 9/1980 | Reinert |
| 4,231,920 A | 11/1980 | Mark et al. |
| 4,262,113 A | 4/1981 | Jaquiss et al. |
| 4,303,575 A | 12/1981 | Reinert |
| 4,341,694 A | 7/1982 | Halpern |
| 4,371,650 A | 2/1983 | Rosenquist et al. |
| 4,388,474 A | 6/1983 | Tanihara |
| 4,430,484 A | 2/1984 | Quinn |
| 4,487,896 A | 12/1984 | Mark et al. |
| 4,721,583 A | 1/1988 | Poisson et al. |
| 4,927,914 A | 5/1990 | Rosenquist |
| 5,010,113 A | 4/1991 | Blount |
| 5,089,559 A | 2/1992 | Blount |
| 5,234,980 A | 8/1993 | Ohira |
| 5,411,999 A | 5/1995 | Gallucci |
| 5,478,874 A | 12/1995 | Miyouga et al. |
| 5,693,697 A | 12/1997 | Weider et al. |
| 5,741,838 A | 4/1998 | Fuhr et al. |
| 5,837,757 A | 11/1998 | Nodera et al. |
| 6,001,929 A | 12/1999 | Nodera et al. |
| 6,022,917 A | 2/2000 | Kobayashi |
| 6,133,360 A | 10/2000 | Barren et al. |
| 6,204,316 B1 | 3/2001 | Schofaliv |
| 6,518,340 B1 | 2/2003 | Fishburn et al. |

FOREIGN PATENT DOCUMENTS

| | | |
|---|---|---|
| EP | 0 619 338 A1 | 10/1994 |
| EP | 0 899 303 A2 | 3/1999 |
| EP | 0 921 174 A1 | 6/1999 |
| JP | 58141205 | 8/1983 |
| JP | 86039985 | 9/1986 |
| JP | 2000087041 | 3/2000 |

OTHER PUBLICATIONS

Epiradiateur test specifications-French Fire Tests NF-P-92-501 and 505.

*Primary Examiner*—Edward J. Cain

(57) ABSTRACT

A transparent, flame retardant polycarbonate composition consisting essentially of an aromatic polycarbonate resin and a flame-retarding amount of a guanidine salt or derivatives thereof, wherein the amount of guanidine salt or derivatives thereof is about 1 wt. % or less.

13 Claims, No Drawings

POLYCARBONATE RESIN COMPOSITIONS AND ARTICLES THEREFROM

CROSS REFERENCE TO RELATED APPLICATIONS

This application is a divisional of U.S. application Ser. No. 10/064,868 filed on Aug. 26, 2002 now U.S. Pat. No. 6,716,902 which is a divisional of U.S. application Ser. No. 09/923,630 filed on Aug. 7, 2001 now U.S. Pat. No. 6,518,340, both of which are herein incorporated by reference.

BACKGROUND OF INVENTION

The invention relates to flame retardant polycarbonate resin compositions and articles made therefrom having high transparency.

Polycarbonate resin compositions are used in a variety of fields including automobiles, electric, electronic, machinery, building and construction applications and the like. Resins used for some of the above-mentioned applications must pass strict flame retardancy requirements, e.g., the flame-retardancy standard according to UL-94 in the U.S.A. Such tests typically involve exposing an object made from the resin to a flame or other heat source for a certain time period. The object may fail the test by catching fire, remaining on fire for too long a period, or by partially melting and dripping flaming resin droplets on a flammable material placed below the object. In some applications requiring miniaturization and/or very thin molded articles, there is an increased risk of a flaming droplet arising from the thinned part of the shaped article. Resins used in such applications need to fulfill the requirements for obtaining a V0-rating according UL-94, i.e. short flame-out times (<10 s) and no (burning) drips that ignite a layer of cotton placed beneath the object.

Satisfactory UL94 V0-ratings of polymers do not always guarantee a good fire performance in building and construction applications. One reason for this discrepancy is the duration requirements for the UL94 tests. In fire tests for the building and construction areas, exposure time to an heat source (i.e. open flame or radiant panel) is in the order of minutes (equal to or more than 5 minutes), while UL94-testing requires much shorter exposure times (2 times 10 seconds).

In certain building and construction applications, there are various government-mandated tests, each with its own specifications and requirements, for evaluating the fire resistance of thermoplastics. A European Single Burner Item (SBI) test has been developed to harmonize the different national standards and better measure fire performance of construction products. This test is defined to cover all important parameters of the various country-specific tests, some of which are speed of flame spread, time to ignition, height of flames, smoke production and production of burning droplets. The formation of burning droplets is critical for passing the French test norm NF-P-92-501 and for determining the overall rating (M1-M4) for the material and application. The formation of droplets is measured in French test norm NF-P-92-505 (also known as the "dripping test") and this test, is considered to be one of the more aggressive tests for fire performance of building and construction materials.

Prior art flame retardant systems for polycarbonate compositions typically employ phosphates and halogens. The phosphates lower the use temperature of the polycarbonate as well as its impact strength. As pointed out by various environmental protection groups, the use of halogens possibly generates toxic fumes when a resin composition burns. Therefore, there is need for an improved flame-retardant resin composition.

Guanidine salts are known to impart flame retardant characteristics to resins used in various applications. JP Patent No. 8603995 discloses the addition of 1-30 wt. % guanidine cyanurate in various resin compositions including polyester, nylon, polycarbonate, epoxy, phenol, and polyurethane. U.S. Pat. No. 4,341,694 discloses compositions displaying intumescent and flame retardant characteristics comprising: a resin selected from polyolefins, polyvinylaromatic resins, polycarbonates, polyacrylates, polyamides, PVC and blends thereof; and about 20-60% by weight of a) a bicyclic phosphate compound, and b) a nitrogen compound selected from the group including guanidine and salts thereof.

Applicants have surprisingly found that guanidine inorganic salts, when added to a polycarbonate resin composition, surprisingly and dramatically increase its pass rate in a specific dripping test, while still retaining its transparent characteristics and other properties.

SUMMARY OF INVENTION

The invention is directed to a thermoplastic resin composition consisting essentially of: a) an aromatic polycarbonate resin; and b) a flame retarding amount of a guanidine salt. In one embodiment of the invention, the guanidine salt is selected from the group consisting of guanidine inorganic salts and mixtures thereof. In a second embodiment, the guanidine salt is selected from the group consisting of guanidine carbonate, guanidine hydrochloride, guanidine bisulfite, guanidine sulfate, guanidine sulfamate, guanidine phosphate, guanidine hydrobromide, and mixtures thereof.

The invention further relates to a method to improve the pass rate in a specific dripping fire test of a thermoplastic resin composition by adding a flame retarding amount of a guanidine salt to said thermoplastic resin composition.

DETAILED DESCRIPTION

As used herein, "flame retarding" amount means an amount sufficient to improve the results observed when conducting the dripping test.

As used herein, "a sufficiently large number" in the context of obtaining a 50% higher dripping test pass rate for samples containing a guanidine salt, derivatives or mixtures thereof refers to the fact that for very small numbers of samples a reduction in pass rate may not be statistically significant, and that a sufficient number of samples must be observed to draw statistically valid conclusions.

Polycarbonate Resin Component

Aromatic polycarbonate resins suitable for use as the polycarbonate component of the composition of the present invention are known compounds whose preparation and properties have been described, see, generally, U.S. Pat. Nos. 3,169,121, 4,487,896 and 5,411,999. In one embodiment, they are polymers having repeating units with a structure of a general formula (I) as follows:

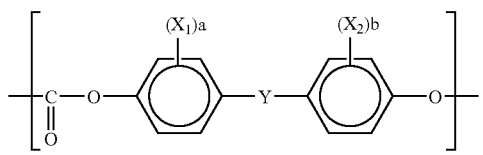

In the formula, $X_1$ and $X_2$ each represent a hydrogen atom or a linear, branched or cyclic alkyl group having from 1 to 6 carbon atoms. The alkyl group may include, for example, a methyl group, an ethyl group, an n-propyl group, an isopropyl group, an n-butyl group, an isobutyl group, a tert-butyl group, an n-amyl group, an isoamyl group, an n-hexyl group, an isohexyl group, a cyclopentyl group, and a cyclohexyl group. These $X_1$ and $X_2$ may be the same or different. "a" and "b" each indicate the number of the substituents, and they are each an integer from 0 to 4. Where the polymer has plural $X_1$'s and $X_2$'s, said plural $X_1$'s may be the same or different; and where it has plural $X_2$'s, said plural $X_2$'s may be the same or different.

Also in the formula, Y represents a single bond, an alkylene group having from 1 to 8 carbon atoms (e.g., methylene, ethylene, propylene, butylene, pentylene, hexylene, etc.), an alkylidene group having from 2 to 8 carbon atoms (e.g., ethylidene, isopropylidene, etc.), a cycloalkylene group having from 5 to 15 carbon atoms (e.g., cyclopentylene, cyclohexylene, etc.), a cycloalkylidene group having from 5 to 15 carbon atoms (e.g., cyclopentylidene, cyclohexylidene, etc.), —S—, —SO—, —SO2—, —O—, —CO—, or a bond of a formula (II-1) or (II-2):

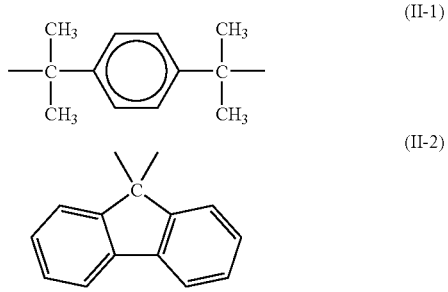

The above-mentioned polymers can be produced generally by reacting a diphenol of a general formula (III) with a carbonate precursor such as phosgene or a carbonate compound, and wherein the molecular weight of the polymers can be established in a known manner with an appropriate quantity of known chain terminators.

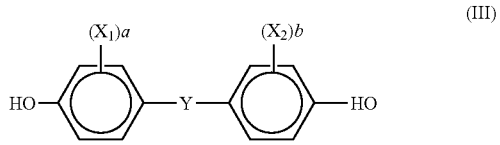

wherein X1, X2, Y, a and b are each as previously defined.

The diphenol of formula (III) includes various diphenols. In one embodiment, the diphenol is 2,2-bis(4-hydroxyphenyl)propane [bisphenol A]. Others include bis(4-hydroxyphenyl)alkanes such as bis(4-hydroxyphenyl)methane, 1,1-bis (4-hydroxyphenyl)ethane, 1,2-bis(4-hydroxyphenyl) ethane; bis(4-hydroxyphenyl)cycloalkanes such as 1,1-bis (4-hydroxyphenyl)cyclohexane, 1,1-bis(4-hydroxyphenyl) cyclodecane; and also 4,4'-dihydroxydiphenyl, bis(4-hydroxyphenyl) oxide, bis(4-hydroxyphenyl)sulfide, bis(4-hydroxyphenyl)sulfone, bis(4-hydroxyphenyl)sulfoxide, bis (4-hydroxyphenyl) ether, bis(4-hydroxyphenyl)ketone, etc. In addition to these, also mentioned is hydroquinone. These diphenols may be used singly or as combined.

Chain terminators or molecular weight regulators may be any and every one generally used in production of ordinary polycarbonates. For example, they can be phenol, long-chain alkyl phenols, monoalkylphenyls, or dialkyl phenols such as p-cresol, p-tert-butylphenol, p-tert-octylphenol, p-cumylphenol, or nonylphenol.

Polycarbonate resins of the present invention are made by known methods, such as, for example, interfacial polymerization, melt polymerization, solution polymerization or solid state polymerization. In the interfacial polymerization method wherein phosgene is used as a carbonate precursor, the diphenol is generally dissolved in an aqueous solution of an acid binder such as sodium hydroxide or potassium hydroxide and reacted with phosgene in a solvent such as methylene chloride.

In the melt transesterification method, the diphenol is transesterified with a carbonate compound in the presence or absence of a solvent and in an inert gas atmosphere and preferably in the presence of a catalyst. The carbonate precursor for use in the melt transesterification method is one or more of a carbonyl halide, a carbonate ester or a haloformate. Suitable carbonyl halides include, for example, carbonyl bromide and carbonyl chloride. Suitable carbonate esters include, for example, diphenyl carbonate, dichlorophenyl carbonate, dinaphthyl carbonate, phenyl tolyl carbonate and ditolyl carbonate. Suitable haloformates include, for example, bishaloformates of a dihydric phenol, such as, for example, hydroquinone, or glycols, such as, for example, ethylene glycol, neopentyl glycol. In one embodiment, the carbonate precursor is diphenyl carbonate.

It is also possible to employ aromatic polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have from 2 to about 40 carbons. A preferred aliphatic diacid is dodecandioic acid. Polyarylates and polyester-carbonate resins or their blends can also be employed.

The polycarbonate resin component of the present invention may be either homopolymers comprising one type of diphenol, or copolymers comprising two or more types of diphenols. They may also be thermoplastic, random-branched polycarbonate resins comprising polyfunctional aromatic compounds along with monophenols, as well as blends of linear polycarbonate and a branched polycarbonate. They may also be polycarbonate-polyorganosiloxane copolymers comprising organosiloxane blocks having a degree of number-average polymerization of 5 or more. They may also be mixtures comprising two or more different polycarbonate resins.

The branched polycarbonates may be prepared by adding a branching agent during polymerization. These branching agents are well known and may comprise polyfunctional organic compounds containing at least three functional groups, which may be hydroxyl, carboxyl, carboxylic anhydride, haloformyl and mixtures comprising at least one of the foregoing. Specific examples include trimellitic acid, trimellitic anhydride, trimellitic trichloride, tris-p-hydroxy phenyl ethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid and benzophenone tetracarboxylic acid, and the like. The branching agents may be added at a level of about 0.05 to about 2.0 weight percent. Branching agents and procedures for making branched polycarbonates are described in U.S. Pat. Nos. 3,635,895 and 4,001,184. All types of polycarbonate end groups are contemplated as being within the scope of the present invention.

Copolyester-carbonate, also known as polyestercarbonates, resins are also suitable for use as the aromatic polycarbonate resin component of the present invention. They are linear or randomly branched polymers resins which contain, in addition to recurring polycarbonate chain units, recurring carbonate groups, carboxylate groups and aromatic carbocyclic groups in the polymer chain, in which at least some of the carbonate groups are bonded directly to the ring carbon atoms of the aromatic carbocyclic groups. Copolyester-carbonate resins suitable for use as the aromatic polycarbonate resin component of the thermoplastic resin composition of the present invention are known compounds whose preparation and properties have been described, see, generally, U.S. Pat. Nos. 3,169,121, 4,430,484 and 4,487,896.

In one embodiment of the invention, the polycarbonate resins have a weight-average molecular weight of from 10,000 to 200,000. In another embodiment, they have a weight-average molecular weight from 15,000 to 50,000, for desirable mechanical strength properties, especially Izod impact strength and moldability.

In another embodiment of the invention, the polycarbonate resins are blends of two or more polycarbonate polymers or copolymers, in which case the weight average molecular weight Mw of the polycarbonate component is the molecular weight of the resulting polycarbonate polymer blend.

In yet another embodiment of the invention, the polycarbonate resin further comprises a graft copolymer component. Said graft copolymer component comprises a graft portion formed from at least two ethylenically unsaturated monomers and a rubbery polymer substrate. Suitable substrates include polymers and copolymers of one or more conjugated dienes, copolymers of conjugated dienes and non-diene vinyl monomers, alkylacrylate polymers, and copolymers of ethylenically unsaturated olefins and nonconjugated diene polymer (EPDM) rubbers. In one embodiment of graft copolymers, the substrate polymers comprise polybutadiene, polybutadienestyrene, polybutylacrylate and ethylene-propylenenorborene polymers. In another embodiment, the substrate polymer forming the graft component comprises polybutadiene.

In another embodiment of the invention, the polycarbonate resin component could also be a mixture of polycarbonate with other thermoplastic resins including but not limited to polystyrenes, polyolefins, aromatic polyesters, and (cyclo)aliphatic polyesters.

Guanidine Salt or Derivative Component

Guanidine salts or derivatives suitable for use in the present invention include, for example, aminoguanidine nitrate (AGN), guanidine nitrate (GN), triaminoguanidine nitrate (TAGN), guanidine BPA, diaminoguanidine nitrate (DAGN), guanidine carbonate, guanidine hydrochloride, guanidine bisulfite, guanidine sulfate, guanidine sulfamate, guanidine phosphate, guanidine hydrobromide, and mixtures thereof. In one embodiment, the guanidine salt is an inorganic salt. In one embodiment of inorganic salts, the salt is guanidine sulfate. In another embodiment, the guanidine inorganic salt is guanidine carbonate.

The amount of guanidine salt used is an amount sufficient for desirable flame retardant properties. In one embodiment, this amount is less than 1 wt. %. In another embodiment, it is about 0.001 to about 0.5 part by weight of the total weight of the composition (wt. %) to pass the dripping test. In yet another embodiment, the flame retarding amount is about 0.001 to 0.01 wt. %. In one embodiment, to optimize the distribution and dispersion of the guanidine sulfate salt in the polycarbonate the guanidine sulfate is dissolved in demineralized water before being added to the polycarbonate.

Other Components

The resin composition of the present invention may also be admixed with traditional halogen-free flame retardants in the prior art as well as variously known and used processing additives, so far as said additives do not interfere with the objects of the invention.

The additives may be used alone or in combination. As used herein, additives may include such materials as whitening agents, thermal stabilizers, antioxidants, light stabilizers, plasticizers, colorants, impact modifiers, extenders, antistatic agents, mold releasing agents, additional resins, blowing agents, and processing aids. The different additives that can be incorporated in the compositions are commonly used and known to one skilled in the art. Illustrative descriptions of such additives may be found in R. Gachter and H. Muller, Plastics Additives Handbook, 4th edition, 1993.

Examples of thermal stabilizers include triphenyl phosphite, tris-(2,6-dimethylphenyl)phosphite, tris-(2,4-di-t-butyl-phenyl)phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl) propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agents include glycerol monostearate, sodium stearyl sulfonate, and sodium dodecylbenzenesulfonate. Examples of mold releasing agents include pentaerythritol tetrastearate, stearyl stearate, beeswax, montan wax, and paraffin wax. Examples of other resins include but are not limited to polypropylene, polystyrene, polymethyl methacrylate, polyphenylene oxide, and polyesters, both aromatic and (cyclo)aliphatic.

Preparation

The production of the compositions of the present invention may utilize any of the blending operations known for the blending of thermoplastics, for example blending in a kneading machine such as a Banbury mixer or an extruder. The sequence of addition is not critical but all components should be thoroughly blended.

To prepare the resin composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device.

In one embodiment, the composition is used as a masterbatch. In this case, a masterbatch is first produced by melt mixing a relatively high amount of the ingredients into the carrying polymeric matrix. Thereafter the masterbatch is added in a small portion to polymer.

The properties of the composition of the present invention make it suitable for use in building and construction industries, especially for use in a variety of glazing applications, for example, roofs, greenhouses, sun rooms, swimming pool enclosures, and the like.

The composition may be shaped into a final article by various techniques known in the art such as injection molding, extrusion, gas assist blow molding, or vacuum forming. In one embodiment, the final article is in the form of extruded sheets, e.g. solid sheets, multi-wall sheets, corrugated sheets and profiled sheets. There is no particular limitation on the composition of additional layers used to form coextruded sheets. There is no particular limitation on the structure or geometry of the multi-wall sheets. In one embodiment, the article in the form of layers may comprise, for example, fluorescing agents to facilitate manufacturing and/or ultraviolet light absorbers to improve weatherability of the final article. The extruded solid sheets typically have a weight from about 0.5 to about 15 kilograms per square meter, and typically have a thickness from about 0.5 mm to about 15 mm, preferably from about 1 mm to about 12 mm. The extruded multi-wall sheets typically have a weight from about 0.5 to about 8 kilograms per square meter, and typically have a thickness of about 2 to about 50 mm, preferable from about 4 to about 40 mm.

EXAMPLES

In the examples, the materials as listed in Table 1 according to the formulations listed in Tables 2-4 were used. All amounts are weight percents based on the total weight of the composition unless otherwise indicated.

Compounding of the resin examples containing ingredients in the proportions shown in the Table below was done using a 25 mm Werner and Pfleiderer twin-screw extruder with conventional conveying elements, kneading or mixing elements, a low-pressure zone with venting under vacuum of any volatiles from the polymer melt, and a die. As the compounded compositions exited the die, they were quenched with water (spray or short quench tank) and cut into pellets with a conventional strand cutter. The extruder barrel and die were maintained at 300° C., with the throughput being set at 20 kg/hr. Subsequently, specimen was made by injection-molding the pellets at a molding temperature of 285° C. (mold temperature 90° C.), and then evaluated for its performance in the dripping test, its mechanical, rheological and thermal properties and transparency.

Optical properties including transmission and haze were measured according to ASTM D1003. Yellowness index was measured according to ASTM D1925, using 2.5 mm and/or 3.2 mm thick plaques on a Gardner XL-835 Colorimeter.

The melt volume index (MVI) of the granulate was measured according to ISO 1133 (300° C./1.2 kg), in units of ml/10 min, with preheating times of 4 and 12 minutes before the measurement started.

Notched Izod impact strengths at 23° C. were measured on molded impact bars (3.2 mm thick) according to ASTM D256. Similar impact tests at several lower temperatures were used to determine the ductile/brittle (D/B) transition temperature of the samples.

Vicat softening temperatures were measured according to ISO 306 with a heating rate of 2° C./min.

With respect to the flame retardant tests, the test method is Norme Francaise NF-P-92-505 of L'Association Francaise de Normalisation (AFNOR), Paris, France or "NF-P-92-505." In this test, square plaques, cut form the molded discs and having a thickness of 3.2 mm, were tested to determine percentage pass rate. In this test, a test sample, having dimensions of 7 cm.×7 cm. and having a minimum weight of 2 grams, is placed on a support grid located thirty millimeters (mm) under a radiator. A drop receptacle containing cotton wool is placed three-hundred mm below the support grid. The radiator is a horizontal 500 Watt electric radiator which irradiates the sample with a radiation intensity of three Watts per square centimeter. The test lasts for a total of ten minutes. If the specimen ignites within the first five minutes of exposure to the radiator, the radiator is removed three seconds after ignition and radiation is continued as soon as the specimen extinguishes. During the second five minutes, radiation is maintained regardless of whether the sample burns. During the test, the radiator is operated for ten minutes. A sample fails this test if the cotton wool starts to burn. Percent pass in the examples that follow indicate the number of samples (out of ten samples) that passed the NF-P-92-505 test.

The following materials were used as shown in Table 1 below:

TABLE 1

| Material | Trade name/ Source | Property/Function |
|---|---|---|
| Polycarbonate I | GE Plastics | IV = 58-59 ml/g |
| Polycarbonate II | GE Plastics | IV = 63.2-65.8 ml/g |
| Tris(2,4-di-t-butylphenyl)phosphite | Irgaphos 168/Ciba | Heat stabilizer |
| Pentaerythritol tetrastearate | Loxiol/Henkel | Release agent |
| 2(2-hydroxy-5-t-octylphenyl))benzotriazole | Cyasorb UV5411/Cytec | UV-stabilizer |
| Guanidine sulfate | Sigma Aldrich | Salt |
| Guanidine carbonate | Sigma Aldrich | Salt |

Guanidine sulfate was used as the flame retardant agent in examples 2-4, 6-8, and 10-11. Guanidine carbonate was used in examples 12 and 13. Examples 1, 5, and 9 are comparative examples. The results are presented in the following tables:

The amounts of masterbatches added to the polycarbonate were 2% and 4% respectively, resulting in guanidine salt levels ranging up to 0.002% and 0.004 as in examples 15-18. Example 14 is a comparative example.

TABLE 2

| | Examples | | | | | | |
|---|---|---|---|---|---|---|---|
| | 1 | 2 | 3 | 4 | 5 | 6 | 7 |
| Polycarbonate I | 83.077 | 83.027 | 83.052 | 83.067 | 83.027 | 83.022 | 83.025 |
| Polycarbonate II | 16.803 | 16.803 | 16.803 | 16.803 | 16.803 | 16.803 | 16.803 |
| PETS | 0 | 0 | 0 | 0 | 0.05 | 0.05 | 0.05 |
| UVA 5411 | 0.07 | 0.07 | 0.07 | 0.07 | 0.07 | 0.07 | 0.07 |
| Irgafos 168 | 0.05 | 0.05 | 0.05 | 0.05 | 0.05 | 0.05 | 0.05 |
| Guanidine sulfate | 0 | 0.05 | 0.025 | 0.01 | 0 | 0.005 | 0.0025 |
| Guanidine Carbonate | 0 | 0 | 0 | 0 | 0 | 0 | 0 |
| Vicat | — | — | — | — | 146.9 | 145.4 | 146.4 |
| MVI (ml/10 min) 4 min | 5.6 | 25.3 | 20.3 | 13.2 | 5.46 | 11.1 | 10.1 |
| Izod @ 23° C. (kJ/m$^2$) | 71.8 | 14.4 | 35.5 | 63 | ductile | ductile | ductile |
| Izod @ 0° C. (kJ/m$^2$) | — | — | — | — | 57.4 | 27.5 | 60.9 |
| % Transmission | 88.3 | 85.4 | 85.7 | 87.4 | 88.3 | 87.8 | 88.2 |
| Haze | 0.50 | 10.00 | 4.90 | 5.50 | 0.6 | 0.9 | 0.7 |
| Yellowness index | 0.3 | 4 | 3 | 1.2 | 0.6 | 1.2 | 0.7 |
| Young Modulus (Mpa) | — | — | — | — | 2250 | 2284 | 2300 |
| Yield stress (Mpa) | — | — | — | — | 62.5 | 63 | 62.8 |
| % pass NF-P 92-505 | 20 | 100 | 100 | 100 | 20 | 100 | 100 |

| | Examples | | | | | |
|---|---|---|---|---|---|---|
| | 8 | 9 | 10 | 11 | 12 | 13 |
| Polycarbonate I | 83.026 | 0 | 0 | 83.025 | 82.977 | 83.025 |
| Polycarbonate II | 16.803 | 99.83 | 99.83 | 16.803 | 16.803 | 16.803 |
| PETS | 0.05 | 0.05 | 0.05 | 0.05 | 0.05 | 0.05 |
| UVA 5411 | 0.07 | 0.07 | 0.07 | 0.07 | 0.07 | 0.07 |
| Irgafos 168 | 0.05 | 0.05 | 0.05 | 0.05 | 0.05 | 0.05 |
| Guanidine sulfate | 0.001 | 0 | 0.005 | 0.0025 | 0 | 0 |
| Guanidine Carbonate | 0 | 0 | 0 | 0 | 0.05 | 0.0025 |
| Vicat | 146.8 | 149.0 | 147.2 | — | — | — |
| MVI (ml/10 min) 4 min | 7 | 3.37 | 6.93 | 9.4 | 22.3 | 11.9 |
| Izod @ 23° C. (kJ/m$^2$) | ductile | ductile | ductile | — | — | — |
| Izod @ 0° C. (kJ/m$^2$) | 65.2 | 74 | 62.7 | — | — | — |
| % Transmission | 88.2 | 88.2 | 88.1 | 88.1 | 85.1 | 88.3 |
| Haze | 0.5 | 0.6 | 0.3 | 0.8 | 7.8 | 0.4 |
| Yellowness index | 0.6 | 0.7 | 1.1 | −0.1 | 3 | −0.1 |
| Young Modulus (Mpa) | 2286 | 2280 | 2284 | — | — | — |
| Yield stress (Mpa) | 62.5 | 61.7 | 62.6 | — | — | — |
| % pass NF-P 92-505 | 60 | 10 | 90 | 100 | 100 | 100 |

In examples 14-18, masterbatches (i.e., concentrate resins with high amounts of additives meant to be diluted by blending with other resin) containing 0.1% of the guanidine salts according to the formula in Table 3 were used to prepare 3 mm thick solid sheets. The masterbatches A and B were mixed with a polycarbonate material commonly used and commercially available for sheet production.

TABLE 3

| | A | B |
|---|---|---|
| Polycarbonate I | 82.617 | 82.617 |
| Polycarbonate II | 16.543 | 16.543 |
| PETS | 0.1 | 0.1 |
| UVA 5411 | 0.07 | 0.07 |
| Irgafos 168 | 0.05 | 0.05 |
| Guanidine Sulphate | 0.1 | 0 |
| Guanidine Carbonate | 0 | 0.1 |
| Water | 0.26 | 0.26 |
| MVI @300° C./1.2 kg (ml/10 min) 4 min pre-heating | 51.4 | 38.3 |

TABLE 4

| | Example | | | | |
|---|---|---|---|---|---|
| | 14 | 15 | 16 | 17 | 18 |
| Polycarbonate + standard additives | 99.78 | 99.778 | 99.778 | 99.776 | 99.776 |
| PETS | 0.1 | 0.1 | 0.1 | 0.1 | 0.1 |
| UVA 5411 | 0.07 | 0.07 | 0.07 | 0.07 | 0.07 |
| Irgafos 168 | 0.05 | 0.05 | 0.05 | 0.05 | 0.05 |
| Guanidine Sulphate | 0 | 0.002 | 0 | 0.004 | 0 |
| Guanidine Carbonate | 0 | 0 | 0.002 | 0 | 0.004 |
| Mw (of sheet) | 31150 | 30591 | 30320 | 30408 | 29994 |
| MVI @300° C./1.2 kg (ml/10 min) 4 min pre-heating | 6.70 | 7.49 | 8.35 | 8.15 | 9.16 |
| MVI @300° C./1.2 kg (ml/10 min) 12 min pre-heating | 7.03 | 7.87 | 9.04 | 8.28 | 10.35 |
| % pass NF-P 92-505 | 50 | 90 | 80 | 100 | 100 |

As shown above, the addition of salts does not significantly vary the molecular weight nor the MVI values of the finished article.

The invention claimed is:

1. An article, comprising a thermoplastic resin composition, comprising:
   an aromatic carbonate resin;
   a guanidine salt present in an amount of less than 1 wt. % based on the total weight of the composition; and
   a resin selected from the group consisting of a graft copolymer component comprising a graft portion formed from at least two ethylenically unsaturated monomers and a rubbery polymer substrate, polypropylene, polystyrene, polymethyl methacrylate, polyphenylene oxide, polyester, and mixtures of two or more of the foregoing;
   wherein the article has a final form selected from the group consisting of an extruded sheet, a solid sheet, a multi-wall sheet, a corrugated sheet, and a profiled sheet.

2. The article of claim 1, wherein said aromatic carbonate resin is selected from the group consisting of homopolymers, copolymers, linear polycarbonate resins, branched polycarbonate resins, and mixtures thereof.

3. The article of claim 1, wherein said guanidine salt is an inorganic salt.

4. The article of claim 1, wherein said guanidine salt or derivatives is selected from the group consisting of aminoguanidine nitrate, guanidine nitrate, triaminoguanidine nitrate, diaminoguanidine nitrate, guanidine carbonate, guanidine BPA, guanidine hydrochloride, guanidine bisulfite, guanidine sulfate, guanidine sulfamate, guanidine phosphate, guanidine hydrobromide, and mixtures thereof.

5. The article of claim 1, wherein said guanidine salt, derivative, or mixture thereof is present in an amount of about 0.001 wt. % to about 0.5 wt. % based on the total weight of the composition.

6. The article of claim 1, further comprising a fluorescing agent.

7. The article of claim 1, wherein the final form is shaped by injection molding, extrusion, blow molding or vacuum.

8. The article of claim 1, wherein the final form is the solid sheet having a weight from about 0.5 to about 15 kilograms per square meter.

9. The article of claim 1, wherein the final form is the multi-wall sheet having a weight from about 0.5 to about 8 kilograms per square meter.

10. The article of claim 1, having a thickness from about 0.5 mm to about 15 mm.

11. The article of claim 1, having a thickness from about 2 mm to about 50 mm.

12. An article, comprising a thermoplastic resin composition, consisting essentially of:
    an aromatic carbonate resin;
    a guanidine salt, derivatives or mixtures thereof, present in an amount of less than 1 wt. % based on the total weight of the composition; and
    a graft copolymer component comprising a graft portion formed from at least two ethylenically unsaturated monomers and a rubbery polymer substrate;
    wherein the article has a final form selected from the group consisting of an extruded sheet, a solid sheet, a multi-wall sheet, a corrugated sheet, and a profiled sheet.

13. An article, comprising a thermoplastic resin composition, consisting essentially of:
    an aromatic carbonate resin;
    a guanidine salt, derivatives or mixtures thereof, present in an amount of less than 1 wt. % based on the total weight of the composition; and
    at least one resin component selected from the group consisting of polypropylene, polystyrene, polymethyl methacrylate, polyphenylene oxide, polyester, and mixtures thereof;
    wherein the article has a final form selected from the group consisting of an extruded sheet, a solid sheet, a multi-wall sheet, a corrugated sheet, and a profiled sheet.

* * * * *